(12) United States Patent
Sheng

(10) Patent No.: US 11,373,623 B1
(45) Date of Patent: Jun. 28, 2022

(54) TRANSPARENT DISPLAY PROJECTION

(71) Applicant: TEXAS INSTRUMENTS INCORPORATED, Dallas, TX (US)

(72) Inventor: Zhongyan Sheng, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/139,831

(22) Filed: Dec. 31, 2020

(51) Int. Cl.
| | |
|---|---|
| *G09G 5/10* | (2006.01) |
| *G09G 5/02* | (2006.01) |
| *G09G 5/00* | (2006.01) |
| *G09G 5/12* | (2006.01) |
| *G09G 3/00* | (2006.01) |
| *G02F 1/137* | (2006.01) |
| *G03B 21/56* | (2006.01) |
| *G02F 1/1334* | (2006.01) |

(52) U.S. Cl.
CPC ............... *G09G 5/12* (2013.01); *G02F 1/137* (2013.01); *G02F 1/1334* (2013.01); *G03B 21/56* (2013.01); *G09G 3/002* (2013.01); *G09G 5/10* (2013.01)

(58) Field of Classification Search
CPC ........................ H01L 25/0753; H01L 27/3234
See application file for complete search history.

(56) References Cited

U.S. PATENT DOCUMENTS

| | | | |
|---|---|---|---|
| 2015/0356938 A1* | 12/2015 | Yoshioka | ............... G03B 21/10 345/206 |
| 2017/0041598 A1* | 2/2017 | Smithwick | ............. G09G 3/003 |

* cited by examiner

*Primary Examiner* — Nan-Ying Yang
(74) *Attorney, Agent, or Firm* — Michelle F. Murray; Charles A. Brill; Frank D. Cimino

(57) ABSTRACT

In some examples, an apparatus includes a light source. The light source is configured to operate in a first mode by emitting light during a first period of time during which a display screen reflecting the light is substantially opaque. The light source is also configured to operate in a second mode by not emitting light during a second period of time during which the display screen is substantially transparent. The light source is also configured to repeatedly alternate between the first mode and the second mode to create a perception of an image resulting from the display screen reflecting the light being displayed on a transparent screen.

20 Claims, 4 Drawing Sheets

TRANSPARENT DISPLAY PROJECTION

SUMMARY

In some examples, an apparatus includes a light source. The light source is configured to operate in a first mode by emitting light during a first period of time during which a display screen reflecting the light is substantially opaque. The light source is also configured to operate in a second mode by not emitting light during a second period of time during which the display screen is substantially transparent. The light source is also configured to repeatedly alternate between the first mode and the second mode to create a perception of an image resulting from the display screen reflecting the light being displayed on a transparent screen.

In some examples, a method includes controlling a display screen to be substantially opaque during a first period of time. The method also includes controlling a light source to emit light during the first period of time. The display screen scatters the light to display an image on a surface of the display screen. The method also includes controlling the display screen to be substantially transparent during a second period of time. The method also includes controlling the light source to not emit light during the second period of time.

In some examples, a system includes an electrically-controllable display screen, controllable between a transparent mode and an opaque mode, and a light source, controllable between a light emitting mode in which the light source emits light onto the display screen and a non-light emitting mode. The display screen is configured to operate in the opaque mode for a first period of time. The light source is configured to emit light for the first period of time. The display screen configured to scatter the light to display an image on a surface of the display screen. The display screen is also configured to be transparent for a second period of time. The light source is also configured to not emit light for the second period of time.

DETAILED DESCRIPTION

Figure 1A:
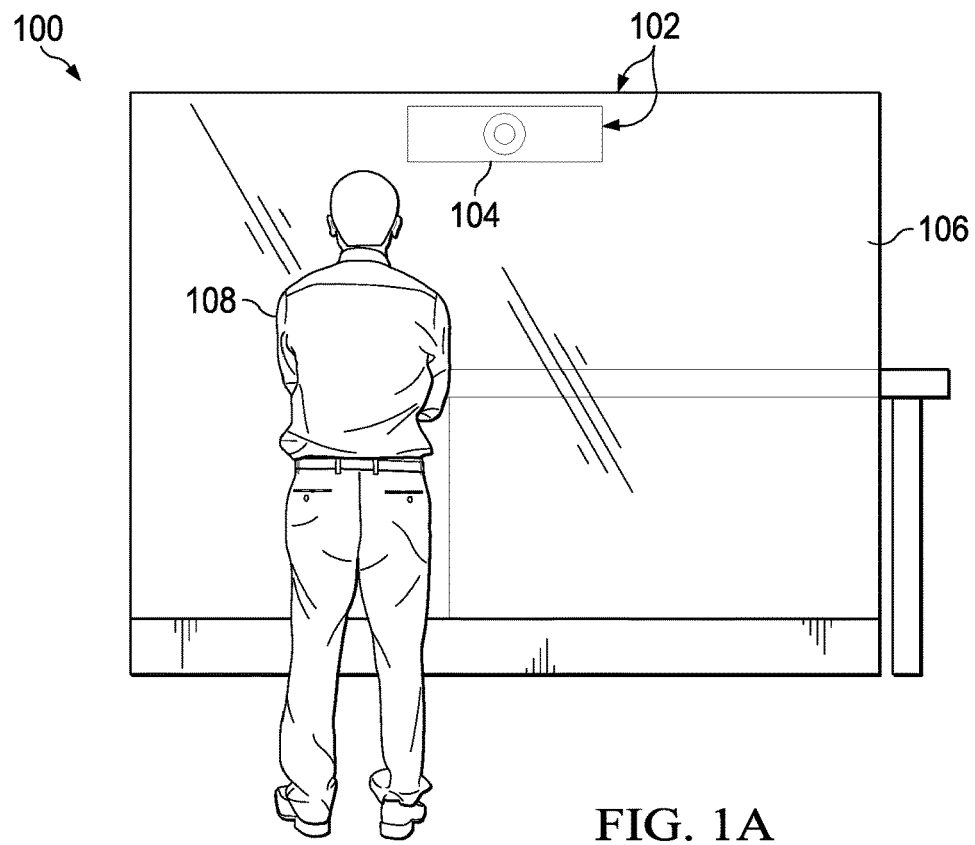
FIG. 1A is a diagram of an image display environment in accordance with various examples.

A semi-transparent display screen enables a viewer to at least partially see through the display screen. The display screen also enables an image to be presented to the viewer via the display screen. In this way, the image may appear at least partially transparent, such that a user can at least partially see through the image and the display screen. However, to be semi-transparent, rather than opaque, the display screen does not scatter or reflect some light that strikes it from a light source. The light source may be, for example, an image projector or other analog or digitally-controllable image source. The light emitted by the light source that is not scattered by the display screen, and instead passes through the display screen, may create hot spots. A hot spot may be an area of unscattered light that, if a viewer is located at a focal point of that hot spot, is approximately equivalent to the viewer looking directly into the light source. This may make the viewer uncomfortable and/or negatively affect the viewer, such as by causing optical discomfort, injury, or damage. Further, the light passing through the display screen may be considered wasted, by way of the light not being scattered by the display screen, resulting in reduced energy efficiency of the light source that is emitting the light.

This description provides for a light source that is synchronized with a display screen to create a viewer-based perception of transparency of the display screen while also presenting an image on the display screen. The display screen is, in some examples, controllable between various modes such that in a first mode the display screen is substantially transparent and in a second mode the display screen is substantially opaque. As used herein, opaque may refer to a state in which the display screen scatters or reflects approximately all light (e.g., 90%, 95%, 99%, of the light) emitted by the light source and that strikes the display screen. In some examples, the display screen further includes a third mode in which the display screen is semi-transparent or semi-opaque. In yet further examples, a first portion of the display screen may be controlled to be substantially transparent while a second portion of the display screen is configured to be substantially opaque or semi-opaque. As used herein, the display screen being substantially transparent may include the display screen having an opacity of less than about 25%, less than about 20%, less than about 15%, less than about 10%, less than about 5%, or less than about 1%. Similarly, the display screen being substantially opaque may include the display screen having an opacity of greater than about 75%, greater than about 80%, greater than about 85%, greater than about 90%, greater than about 95%, or greater than about 99%. Further, the display screen being semi-transparent or semi-opaque may include the display screen having an opacity greater than the threshold for being substantially transparent or the display screen having an opacity less than the threshold for being substantially opaque, respectively.

The display screen and the light source may be communicatively coupled, via wired or wireless communication, to enable the display screen and the light source to coordinate and synchronize duty cycles. In other examples, the display screen and the light source may each be communicatively coupled to a separate control device that exerts a degree of control over the display screen and the light source to coordinate and synchronize duty cycles of the display screen and the light source. A duty cycle of the light source may be a percentage of total time of operation of the light source that the light source is emitting light (e.g., the light source is active). A duty cycle of the display screen may be a percentage of total time of operation of the display screen that the display screen is opaque (e.g., the display screen is active). The duty cycle of the display screen may have an inverse relationship to a perceived transparency of the display screen. For example, at 100% duty cycle, the display screen may be perceived to be substantially opaque continuously. At 0% duty cycle, or another duty cycle near or approximately equal to 0%, the display screen may be perceived to be substantially transparent continuously. Thus, as the duty cycle of the display screen increases, the perceived transparency of the display screen may decrease and as the duty cycle of the display screen decreases, the perceived transparency of the display screen may increase. By synchronizing duty cycles of the light source and the display screen, the light source may, in some examples, be controlled to only emit light while the display screen is opaque. Conversely, by synchronizing duty cycles of the light source and the display screen, the display screen may, in some examples, be controlled to be opaque only while the light source is emitting light.

By controlling the light source to emit or not emit light, and the display screen to be opaque or transparent, at a high frequency, an illusion of constant transparency of the display screen is achieved for a viewer. As used herein, a high frequency may be a frequency at least about 60 hertz, or higher (such as about 120 hertz, about 240 hertz, etc.). For example, the viewer may see an image on the display screen resulting from the display screen scattering light emitted by the light source while the display screen is opaque. However, the viewer may perceive the display screen as being transparent (e.g., not be aware of the moment of opaque operation of the display screen) because the light source and the display frequency are changing modes of operation at the high frequency. By controlling the duty cycles of the projector and the display screen, a transparency of the display screen may be controlled. However, as the display screen appears more transparent, an image being displayed on the display screen may become less bright or vibrant. For example, in normal operation the light source and the display screen may be controlled to operate at a fifty percent duty cycle. Increasing the duty cycle to a value greater than 50 percent may make an image being displayed on the display screen brighter and reduce a perceived transparency of the display screen. Similarly, decreasing the duty cycle to a value less than 50 percent may make an image being displayed on the display screen less bright and increase a perceived transparency of the display screen.

FIGS. 1A, 1B, 1C, and 1D are diagrams of an image display environment 100 in accordance with various examples. In at least some examples, the image display environment 100 includes a display system 102 that includes a light source 104 and a display screen 106. In at least some examples, a viewer 108 located on one side of the display screen 106, and viewing the display system 102, can view an image presented by the light source 104 on the display screen 106 and/or view an item or location on an opposite side of the display screen 106 from the viewer 108 by looking through the display screen 106.

The light source 104 is, in some examples, a projector. For example, the light source 104 may be a laser projector, a light emitting diode (LED) projector, or any other suitable projection technology. Although not shown in FIGS. 1A-1D, in at least some examples, the light source 104 includes a processor or other component capable of performing data processing and/or generating or providing signals, such as control signals. The display screen 106 may be any display screen capable of having an opacity of the display screen modulated. For example, in various implementations the display screen 106 may be a polymer dispersed liquid crystal (PDLC) display, a polymer network liquid crystal (PNLC) display, or any other suitable display that is electrically controllable to change transparency of the display screen 106. Although not shown in FIGS. 1A-1D, in at least some examples, the display screen 106 includes a processor or other component capable of performing data processing and/or generating or providing signals, such as control signals.

FIG. 1A is a front view of the image display environment 100. As shown in FIG. 1A, during a first period of time, the light source 104 is operational (e.g., powered on) but is in a mode of operation in which the light source 104 is not emitting light. Correspondingly, during the first period of time the display screen 106 operates in a mode of operation in which the display screen 106 is substantially transparent (e.g., the display screen 106 scatters or reflects approximately no light). The light source 104 and the display screen 106 are synchronized such that the light source 104 does not emit light while the display screen 106 is transparent, and vice versa. During the first period of time, the viewer 108 may view an object, shown in FIG. 1A as a table, through the display screen 106 with substantially no visible obstruction caused by the display screen 106.

It at least some examples, the synchronization of the light source 104 and the display screen 106 as described herein is performed by comparing a delay between control signals of the light source 104 and the display screen 106. For example, the light source 104 may provide a light source control signal for controlling emission, or no emission, of light by the light source 104. Similarly, the light source 104 may provide a display screen control signal for controlling transparency of the display screen 106 and may transmit that display screen control signal to the display screen 106 using any suitable transmission medium or process. Based on the display screen control signal, the display screen 106 may modify a transparency of at least a portion of the display screen 106. In some examples, to synchronize emission of light by the light source 104 with opacity of the display screen 106, or conversely to synchronize no emission of light by the light source 104 with transparency of the display screen 106, the light source 104 synchronizes the light source control signal with the display screen control signal. In some examples, the light source 104 is coupled to a photodetector (not shown) or other sensor or component that provides feedback data (e.g., such as timing related feedback) to the light source 104. In at least some examples, the photodetector is a component of the light source 104 that is oriented in a substantially same direction as a direction in which the light source 104 emits light (e.g., such as in a direction of projection while the light source 104 is a projector). Based on feedback received from the photodetector, the light source 104 may determine whether light is being emitted from the light source 104 and/or whether the display screen 106 is transparent or opaque.

Based on a relationship between detection of emission or no emission of light by the light source 104 and the light source control signal, the light source 104 can determine a latency associated with the light source control signal and the display screen control signal. For example, a relationship between detection of emission or no emission of light by the light source 104 and the light source control signal, the light source 104 can determine a latency between assertion, or de-assertion, of the light source control signal and emission, or non-emission of light by the light source 104. Similarly, based on a relationship between opaqueness or transparency of the display screen 106 and the display screen control signal, the light source 104 can determine a latency between assertion, or de-assertion, of the display screen control signal and opaqueness or transparency of the display screen 106. The light source 104 may determine when to assert the light source control signal and/or the display screen control signal such that actions controlled according to the respective control signals occur substantially simultaneously (e.g., in synchronization), accounting for determined latency. For example, in one implementation the light source 104 delays assertion or de-assertion of the light source control signal for a period of time to compensate for latency in the display screen 106 receiving the display screen control signal and/or performing an action responsive to receipt of the display screen control signal. In other examples, the light source 104 modifies a time of assertion or de-assertion of the light source control signal for a period of time to compensate for latency in a light-emitting element of the light source 104 performing an action responsive to the light source control signal. In at least some examples, the projector determines the latency in the display screen 106 by detecting, via a photodetector, a delay between assertion by the light source 104 of a control signal to cause the display screen 106 to become opaque and the display screen 106 becoming opaque responsive to the control signal. Based on the determined latency, the light source 104 may delay emission of light by the light source 104 for an amount of time determined based on the detected latency of the display screen 106 in acting responsive to the control signal. For example, based on the determined latency, and a latency of the light source 104, the light source 104 may determine a timing and sequence for providing the control signal to the display screen 106 and controlling the light source 104 to emit light such that light is not emitted by the light source 104 until the display screen 106 is opaque.

While generation of the light source control signal, the display screen control signal, and receipt of timing related feedback is described above with respect to the light source 104, in other examples operation is reversed such that at least some of the actions are performed by the display screen 106. In yet other examples, at least some of the action ascribed above to the light source 104 are instead performed by a control device (not shown) that is separate from both the light source 104 and the display screen 106, but is in communication with the light source 104 and the display screen 106. In some examples, the control device includes, or is in communication with, the photodetector or other component or sensor that provides the timing related feedback.

Figure 1B:
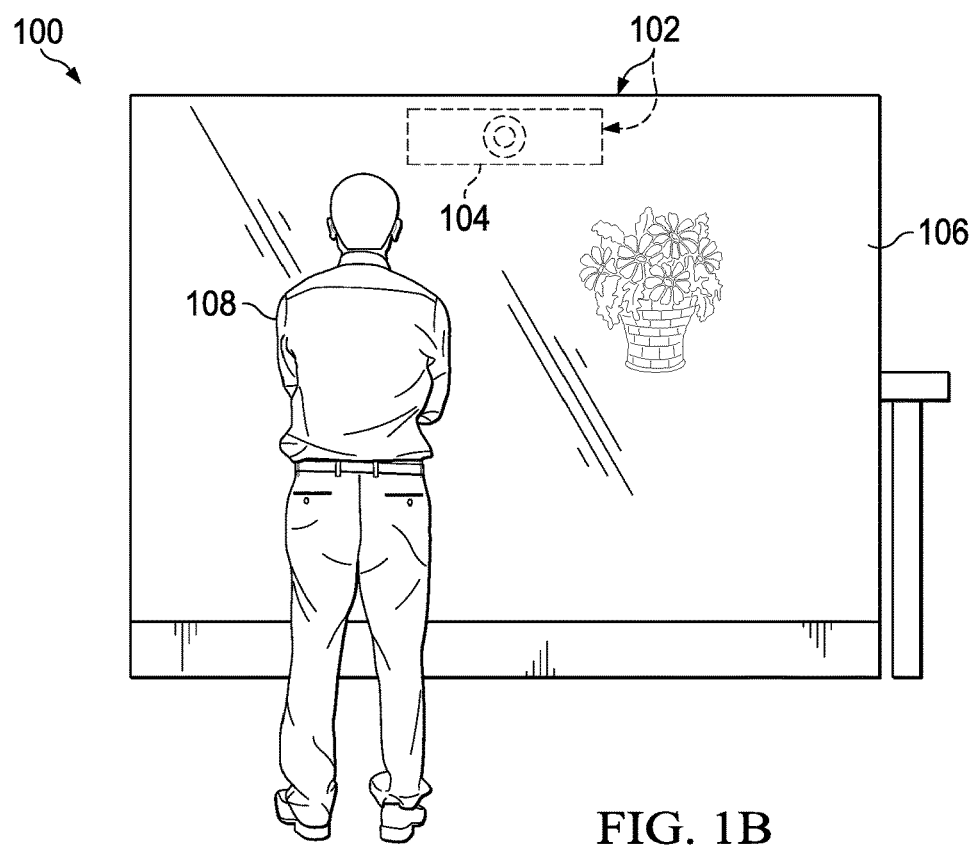
FIG. 1B is a diagram of the image display environment in accordance with various examples.

FIG. 1B is another front view of the image display environment 100. As shown in FIG. 1B, during a second period of time, the light source 104 is in a mode of operation in which the light source 104 is emitting light. Correspondingly, during the second period of time the display screen 106 operates in a mode of operation in which the display screen 106 is substantially opaque (e.g., the display screen 106 scatters or reflects approximately all light emitted by the light source 104 that strikes the display screen 106). The light source 104 and the display screen 106 are synchronized such that the light source 104 emits light only while the display screen 106 is opaque, and vice versa. During the second period of time, the viewer 108 may not be able to view the object, shown again in FIG. 1B as a table, through the display screen 106.

Figure 1C:
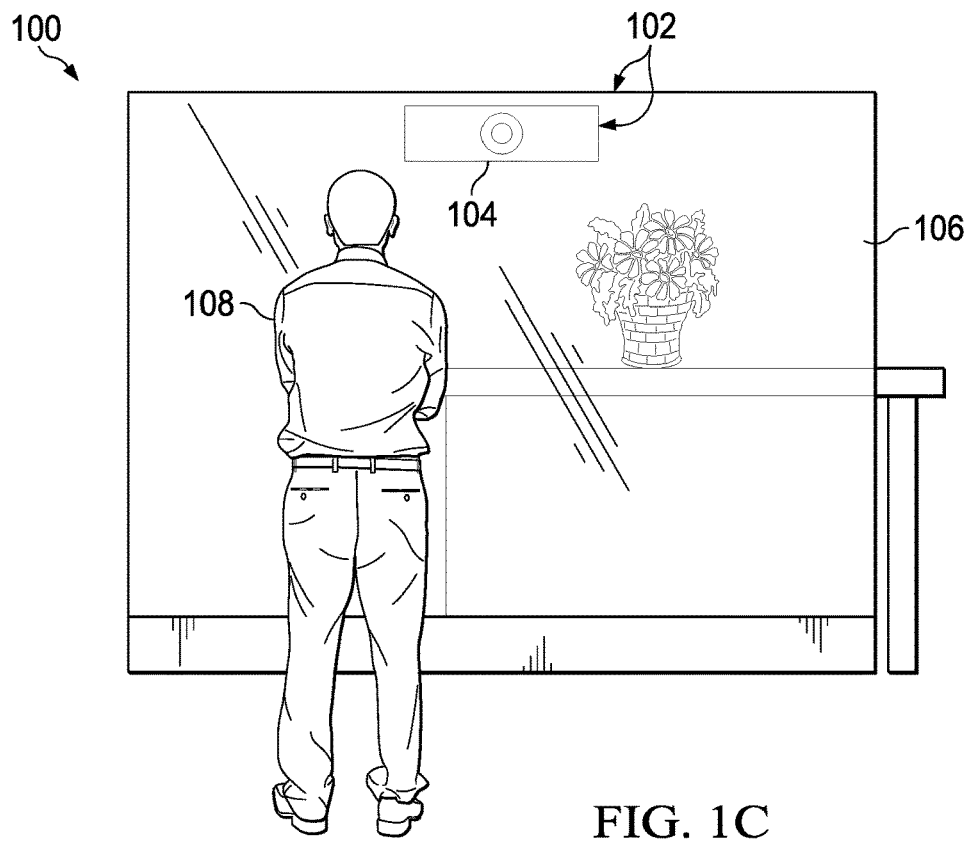
FIG. 1C is a diagram of the image display environment in accordance with various examples.

FIG. 1C is another front view of the image display environment 100. As shown in FIG. 1C, to the viewer 108, while the light source 104 and the display screen 106 repeatedly and rapidly alternate between the first and second periods of time as shown in FIGS. 1A and 1B, respectively, the display screen 106 appears simultaneously both substantially transparent and to be displaying light emitted by the light source 104 and scattered by the display screen 106. For example, the light source 104 and the display screen 106 are each synchronously controlled to turn on and turn off at a high frequency. For the light source 104, turning on and off includes emitting and not emitting light, but may not include physically powering on and powering off the light source 104. For the display screen 106 turning on and off includes applying a voltage and/or current to cause the display screen 106 to be opaque and removing application of the voltage and/or current to cause the display screen 106 to become transparent (or to return to a natural state in which the display screen 106 is no longer opaque). While the light source 104 and the display screen 106 turn on an off, light emitted by the light source 104 and scattered by the display screen 106 has a flickering pattern. The light source 104 and the display screen 106 may be controlled to turn on and off at a frequency sufficiently high as to render the flickering pattern imperceptible to a human eye.

A duty cycle of the light source 104 and the display screen 106 may control a perceived level of transparency of the display screen 106, as well as a brightness of an image created on the display screen 106 resulting from the display screen 106 scattering light emitted by the light source 104. For example, a default duty cycle for transparent display using the light source 104 and the display screen 106 may be a duty cycle of fifty percent. While the duty cycle is increased to a value greater than fifty percent, the perceived level of transparency of the display screen 106 may decrease and the brightness of the image created on the display screen 106 may increase. Similarly, while the duty cycle is decreased to a value less than fifty percent, the perceived level of transparency of the display screen 106 may increase and the brightness of the image created on the display screen 106 may decrease. In this way, transparent display on the display screen 106 may be adjustable to suit a particular use case and application environment. Various use cases or application environments for transparent display may include automotive or other vehicle (e.g., airplane, boat, etc.) applications, retail displays, windows, entertainment display screens, portable display screens, augmented reality devices, wearable devices (e.g., such as glasses), mobile devices, digital personal assistants, and the like.

While described herein as the light source 104 and the display screen 106 having a substantially same duty cycle, in various examples the duty cycle of the light source 104 may vary from the duty cycle of the display screen 106. For example, some implementations of the display screen 106 may include multiple individually controllable display panels that are tiled or arranged to form the display screen 106. Some of these display panels may be controlled to have a perceived transparency different from other of the display panels by varying duty cycles of some of the display panels compared to other of the display panels while a duty cycle of the light source 104 remains substantially fixed or unchanging. Similarly, some implementations of the light source 104 may include multiple individual light sources that together emit light onto the display screen 106. Some of these individual light sources may be controlled to have a brightness different from other of the individual light sources by varying duty cycles of some of the individual light sources compared to other of the individual light sources while a duty cycle of the display screen 106 (or display panels of the display screen 106) remains substantially fixed or varies, as described above.

Figure 1D:
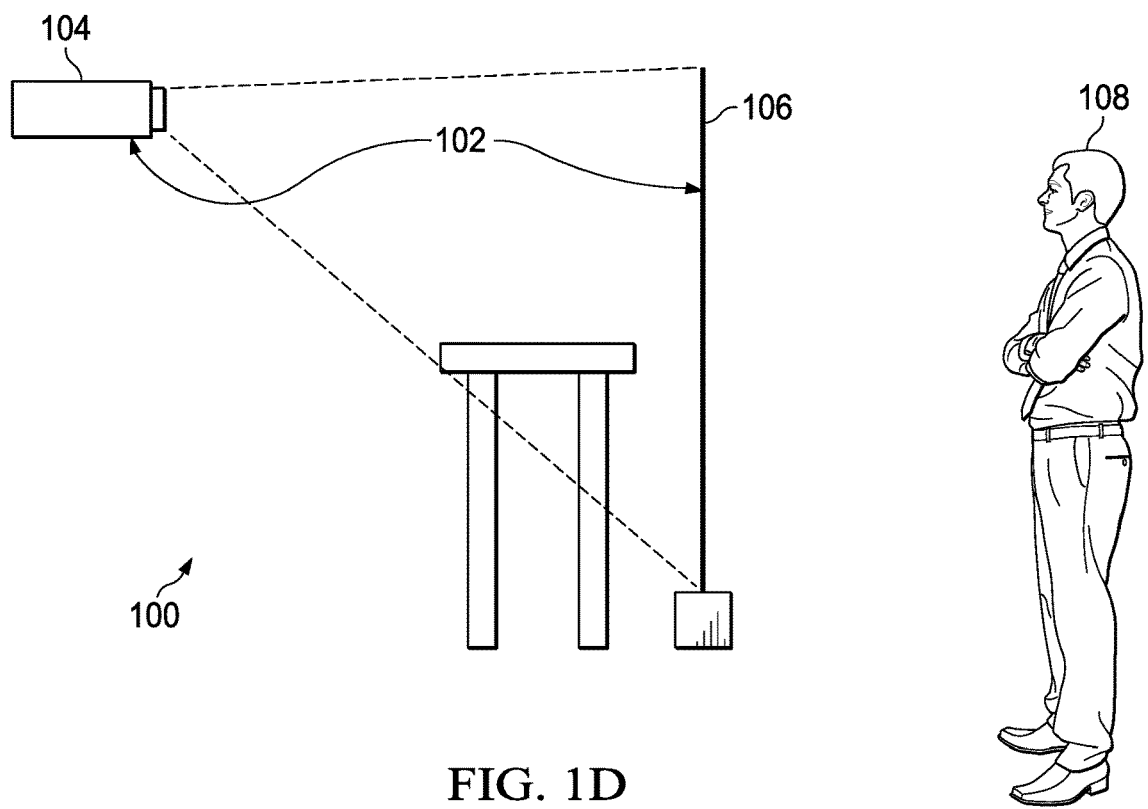
FIG. 1D is a diagram of the image display environment in accordance with various examples.

FIG. 1D is a side view of the image display environment 100. As shown in FIG. 1D, the viewer 108 is located relative to a first side of the display screen 106 and an object, shown in FIG. 1D as a table, is located relative to a second side of the display screen 106. As described above, while the display screen 106 is controlled to be transparent, the viewer 108 may view the table through the display screen 106. However, while the display screen 106 is controlled to be opaque, the viewer 108 may be obstructed by the display screen 106 from viewing at least a portion of the table. In at least some examples, while the display screen 106 is opaque, the light source 104 emits light that is scattered by the display screen 106. While the light source 104 is illustrated in FIGS. 1A-1D as being rear mounted, and ceiling mounted, in various other examples the light source 104 may be located in any suitable position relative to the display screen 106 such that light emitted by the light source 104 strikes the display screen 106.

Figure 2:
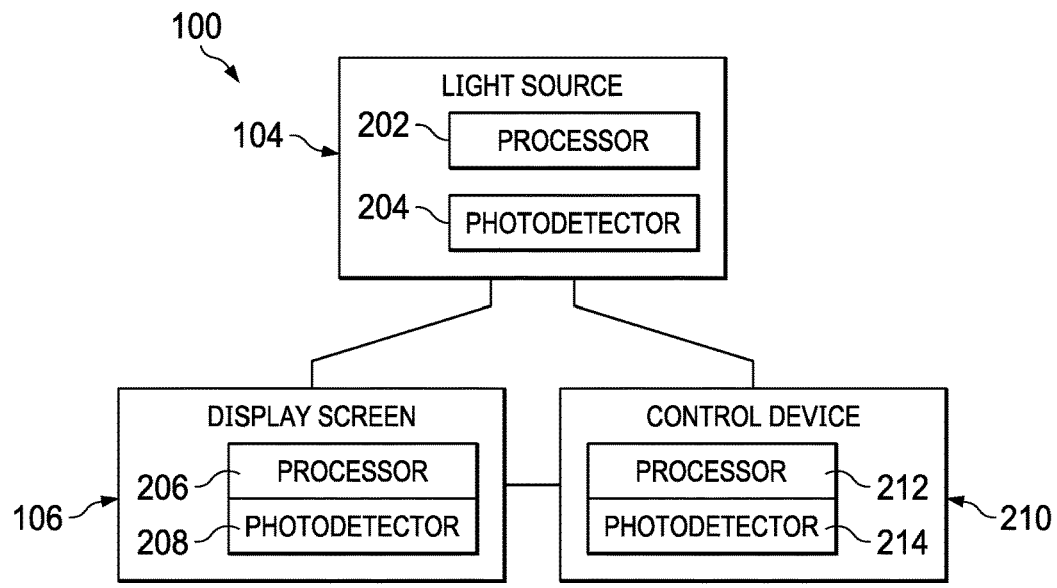
FIG. 2 is a block diagram of the image display environment in accordance with various examples.

FIG. 2 is a block diagram of the image display environment 100. For example, FIG. 2 shows the light source 104 including a processor 202 and the display screen 106 including a processor 206. In at least some examples, the light source 104 may also include a photodetector 204 and/or the display screen 106 may also include a photodetector 208. While shown in FIG. 2 as the light source 104 having a physical connection to the display screen 106, in at least some examples the connection is a wireless connection according to any suitable standard, protocol, or process. Although not shown in FIG. 2, in at least some examples, the light source 104 and/or the display screen 106 includes other components, such as transmitters, receivers, memory, antennae, etc.

As described elsewhere herein, in at least some examples the light source 104 may control the display screen 106 to become opaque while the light source 104 is emitting light and to become transparent while the light source 104 is not emitting light. In at least some examples, such control is based on the photodetector 204 indicating to the processor 202 that light is being emitted from the light source 104. For example, based on the photodetector 204 indicating that the light source is emitting light, the processor 202 may transmit a control signal to the display screen 106 to control the display screen 106 to become opaque. Conversely, based on the photodetector 204 indicating that the light source is not emitting light, the processor 202 may transmit a control signal to the display screen 106 to control the display screen 106 to become transparent. Alternatively, the processor 202 may receive the indication that the light source 104 is emitting light from the photodetector 208 of the display screen 106 and may control the display screen 106 as described above based on the indication from the photodetector 208. Responsive to receiving a control signal from the light source 104, the processor 206 may control the display screen 106 to become opaque or transparent as instructed by the control signal.

As described above, optionally, rather than the light source 104 controlling the display screen 106 or vice versa, a control device may be present that controls both the light source 104 and the display screen 106. FIG. 2 shows such an optional control device 210. In at least some examples, the control device 210 includes a processor 212. In at least some examples, the control device 210 may also include a photodetector 214. While shown in FIG. 2 as the control device 110 having a physical connection to the light source 104 and/or display screen 106, in at least some examples the connection is a wireless connection according to any suitable standard, protocol, or process. Also, the control device 210 may be communicatively connected to one of the light source 104 or the display screen 106 according to a first connection (e.g., wired or wireless, or wireless according to a first protocol) and communicatively connected to a second of the light source 104 or the display screen 106 according to a second connection (e.g., wired or wireless, or wireless according to a second protocol). Although not shown in FIG. 2, in at least some examples, the control device 210 includes other components, such as transmitters, receivers, memory, antennae, etc.

In some examples, rather than the light source 104 controlling the display screen 106 as described above, a control device 210 may be included in the image display environment 100. The control device 210 may control the light source 104 and/or the display screen 106. For example, the control device 21 may control the display screen 106 to become opaque while the light source 104 is emitting light and to become transparent while the light source 104 is not emitting light. In at least some examples, such control is based on the photodetector 214 indicating to the processor 212 that light is being emitted from the light source 104. For example, based on the photodetector 214 indicating that the light source is emitting light, the processor 212 may transmit a control signal to the display screen 106 to control the display screen 106 to become opaque. Conversely, based on the photodetector 214 indicating that the light source is not emitting light, the processor 212 may transmit a control signal to the display screen 106 to control the display screen 106 to become transparent. Alternatively, the processor 212 may receive the indication that the light source 104 is emitting light from the display screen 106 (e.g., via the processor 206 or the photodetector 208) or from the light source 104 (e.g., from the processor 202 or the photodetector 204), and may control the display screen 106 as described above based on the received indication. Similarly, the control device 210 may control the light source 104 to emit light only while the control device 210 is also controlling the display screen 106 to be opaque. Similarly, the display screen 106 may provide an indication to the control device 210 that the display screen 106 is opaque, responsive to which the control device 210 may control the light source 104 to emit light. Also, in at least some examples, the light source 104 and/or the control device 210 may determine whether the display screen 106 is transparent or opaque based on the photodetector 204 or the photodetector 214, respectively. For example, the photodetector 204 or the photodetector 214 may detect visible light being reflected by the display screen 106 or may detect invisible light, such as infrared light, which may be emitted by an infrared emitter (not shown) included in the light source 104 and/or the control device 210 for determining whether the display screen 106 is opaque or transparent.

Figure 3:
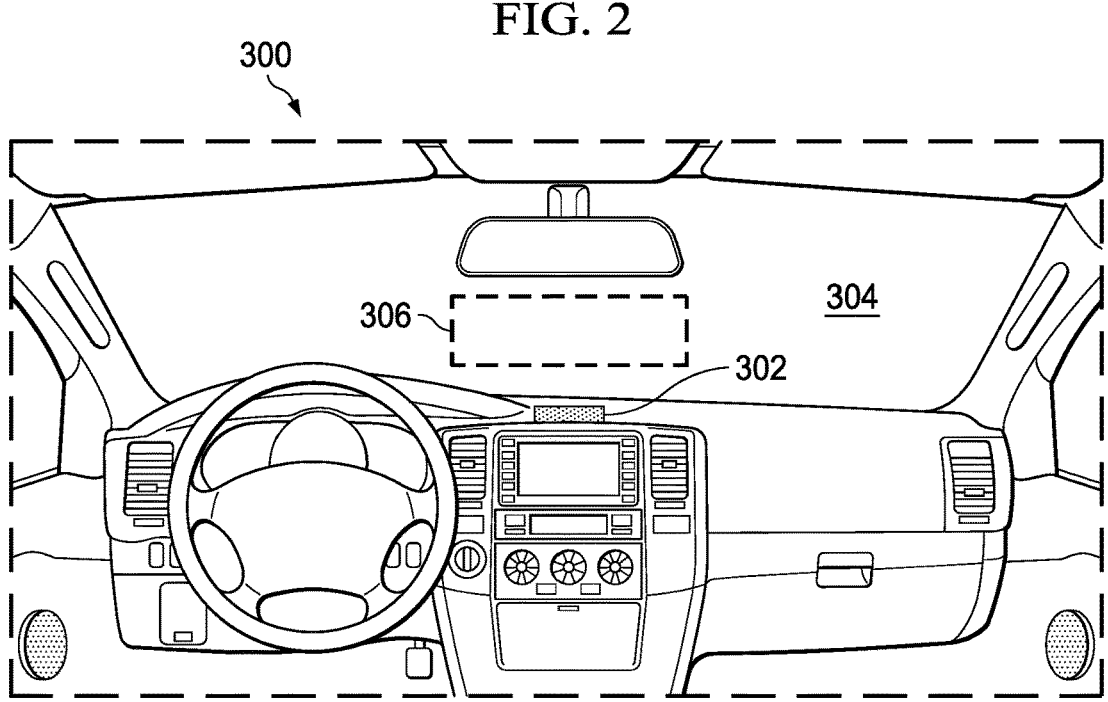
FIG. 3 is a diagram of another image display environment in accordance with various examples

FIG. 3 is a diagram of another image display environment 300 in accordance with various examples. In at least some examples, the image display environment 300 is implemented in a vehicle. While FIG. 3 illustrates that vehicle as an automobile, any autonomous or non-autonomous vehicle may be suitable, such as an airplane, helicopter, boat, truck, recreational vehicle, motorcycle, etc. In at least some examples, the image display environment 300 includes a light source 302 and a display screen 304. In at least some examples, the light source 302 may operate substantially similar to the light source 104, described with reference to the various figures herein. In at least some examples, a viewer (not shown) may be located on one side of the display screen 304 and can view an image presented by the light source 302 on the display screen 304 and/or view an item or location on an opposite side of the display screen 304 from the viewer by looking through the display screen 304. In at least some examples, a portion 306 of the display screen 304 is controllable to be opaque or transparent. In at least some examples, the portion 306 may operate substantially similar to the display screen 106, described with reference to the various figures herein. While FIG. 3 illustrates the display screen 304 as being a windshield of the vehicle shown in FIG. 3, the display screen may be any suitable component capable of being controlled to be opaque or transparent. For example, the display screen may be a window, a roof, a partition or divider between areas of the vehicle, etc. Also, while FIG. 3 illustrates only the portion 306 of the display screen 304 as being controllable to be opaque or transparent, in some examples the portion 306 and the display screen 304 have substantially a same size, such that substantially all of the display screen 304 may be controllable to be transparent or opaque. Similarly, in at least some examples a location of the portion 306 within the display screen 304 may be controllable such that a user may select which area of the display screen 304 is the portion 306. In a manner substantially similar to that as described elsewhere herein with reference to the light source 104 and the display screen 106, in at least some examples the portion 306 is controlled by the light source 302 to be opaque while the light source 302 is emitting light and to be transparent while the light source 302 is not emitting light. Alternatively, one or both of the light source 302 or the portion 306 may be controlled by a control device (not shown).

Figure 4A:
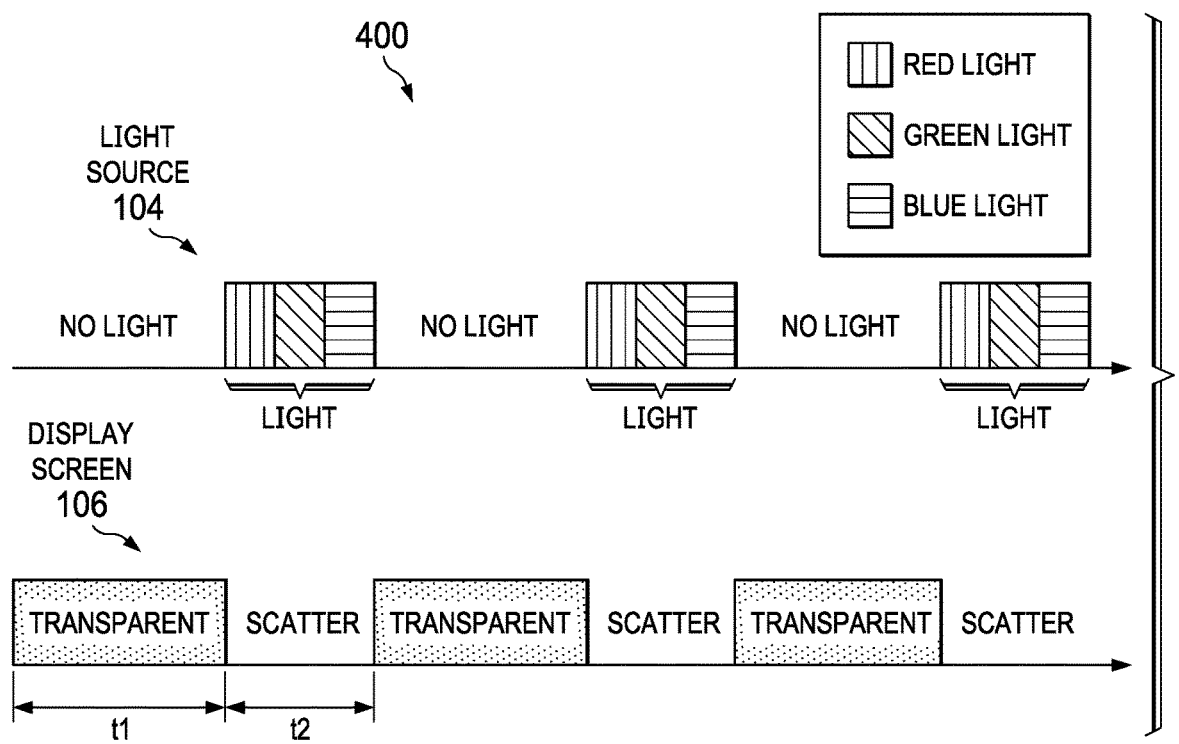
FIG. 4A is a timing diagram of an image display method in accordance with various examples.
Figure 4B:
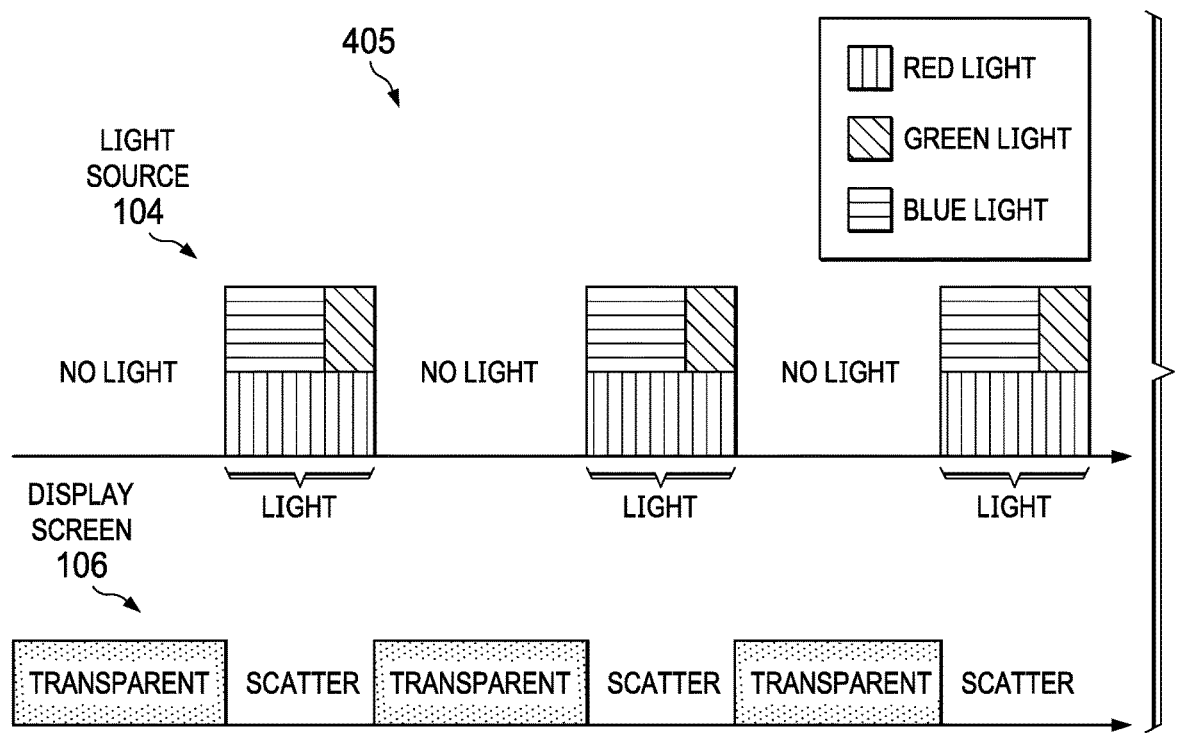
FIG. 4B is a timing diagram of an image display method in accordance with various examples.

FIGS. 4A and 4B are timing diagrams 405 and 410, respectively, of an image display method in accordance with various examples. In at least some examples, the timing diagrams 405 and 410 illustrates operation of the light source 104 and the display screen 106, as described above with respect to the image display environment 100. As shown by the timing diagram 400, during a first period of time, noted as t1, the light source 104 is controlled to not emit light. Similarly during t1, the display screen 106 is controlled to be substantially transparent or clear. During a second period of time, noted as t2, the light source 104 is controlled to emit light. Similarly during t2, the display screen 106 is controlled to be substantially opaque. During t2, the display screen 106 scatters or reflects the light emitted by the light source 104 that strikes the display screen 106. In at least some examples, the scattered light creates an image viewable on the display screen 106.

As shown in the timing diagram 405, t1 and t2 repeat sequentially such that the light source 104 and the display screen 106 each have a duty cycle of fifty percent. For the purposes of the timing diagram 405, the duty cycle is defined according to t2/(t1+t2). Accordingly, increasing t2 (and/or decreasing t1) will decrease the duty cycle (increasing perceived transparency of the display screen 106 and decreasing brightness of an image present on the display screen 106 resulting from light emitted by the light source 104). Similarly, increasing t1 (and/or decreasing t2) will increase the duty cycle (decreasing perceived transparency of the display screen 106 and increasing the brightness of the image present on the display screen 106 resulting from the light emitted by the light source 104).

Of the fifty percent duty cycle in which the light source 104 is emitting light, in some examples the light source 104 emits multiple colors of light (e.g., red, green, and blue) simultaneously (e.g., such as in three-chip projectors). In other examples, and as illustrated in FIG. 4A, the fifty percent duty cycle in which the light source 104 is emitting light is then further subdivided such that each color of light emitted by the light source 104 has its own duty cycle (e.g., such as in one-chip projectors). For example, of the fifty percent duty cycle in which the light source 104 is emitting light, red light, green light, and blue light may each have a duty cycle of approximately one-third (e.g., such that the fifty-percent duty cycle is split into three timeslots). In yet other examples, and as illustrated in FIG. 4B, the fifty percent duty cycle in which the light source 104 is emitting light is then further subdivided such that one color of light is emitted substantially continuously during first and second timeslots of the fifty percent duty cycle in which the light source 104 is emitting light and a first color of light emitted during the first timeslot alternates with a second color of light emitted during the second timeslot. The projector chips may be of any suitable type, such as liquid crystal on silicon (LCoS), digital light processing (DLP), digital micromirror device (DMD), etc.

As described above, by modulating the display screen 106 between periods of opacity and transparency at high frequency, a perception of continuous transparency of the display screen 106 is created. However, by reflecting light off the display screen 106 during the periods of opacity of the display screen 106 (e.g., only during t2), a perception of an image, created by the reflected light, being present on the continuously transparent display screen 106 is also created. Because the light source 104 does not emit light during t1, substantially all light emitted by the light source 104 is reflected by the display screen 106 and substantially no light emitted by the light source 104 passes through the display screen 106 unscattered. In this way, the creation of hot spots, as described above, is avoided and energy efficiency of image display by the light source 104 on the display screen 106 is increased.

Figure 5:
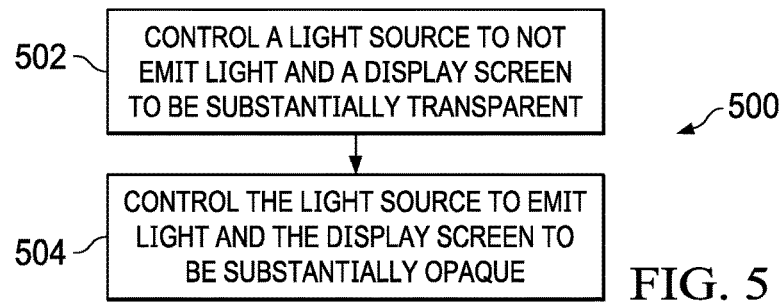
FIG. 5 is a flowchart of an example method in accordance with various examples.

FIG. 5 is a flowchart of an example image display method 500 in accordance with various examples. In at least some examples, the method 500 is implemented in a system such as the display system 102 of the image display environment 100 and/or in the image display environment 300, as described elsewhere herein. The method 500 is implemented, in some examples, to provide transparent display projection. For example, a light source, such as the light source 104, emits light to create an image on a display screen, such as the display screen 106, which is modulated between periods of full opacity and full transparency to create a perception of continuous transparency.

At operation 502, the light source is controlled to not emit light and the display screen is controlled to be substantially transparent or clear. The light source is, in at least some implementations, a projector. In some examples, the control is exerted by a processor of the light source. In other examples, the light source and the display screen are each controlled by a control device that is separate from both the light source and the display screen.

At operation 504, the light source is controlled to emit light and the display screen is controlled to be substantially opaque. In some examples, the control is again exerted by a processor of the light source. In other examples, the light source and the display screen are each controlled by a control device that is separate from both the light source and the display screen. By emitting light only while the display screen is opaque, substantially all light emitted by the light source is scattered by the display screen. Because substantially all light emitted by the light source is scattered by the display screen, the creation of hot spots, as described above, is avoided and energy efficiency of image display by the light source on the display screen is increased.

By modifying a duty cycle of the light source and the display screen, a perceived transparency of the display screen is modified. For example, by increasing the duty cycle of the light source and the display screen, a perceived transparency of the display screen is decreased. Also, by increasing the duty cycle of the light source and the display screen, a brightness of an image presented on the display screen by scattering light emitted by the light source is increased. By decreasing the duty cycle of the light source and the display screen, a perceived transparency of the display screen is increased. Also, by decreasing the duty cycle of the light source and the display screen, the brightness of the image presented on the display screen by scattering light emitted by the light source is decreased.

In at least some examples, the operation 502 and the operation 504 are performed consecutively in a repeated manner. For example, the light source may be controlled to alternate between emitting light and not emitting light, and the display screen controlled to be substantially opaque or substantially transparent, at a high frequency. By controlling the light source and the display screen to alternate modes at the high frequency, a flicker that is created by the light source emitting and not emitting light becomes imperceptible to a viewer of the display screen. Similarly, by controlling the light source and the display screen to alternate modes at the high frequency, the periods of opacity of the display screen become imperceptible to the viewer of the display screen and the viewer perceives the display screen to be continuously transparent. However, because the display screen is not transparent while the light source is emitting light, light does not pass through the display screen unscattered.

While the operations of the method 500 described herein have been described and labeled with numerical reference, in various examples, the method 500 includes additional operations that are not recited herein. In some examples, any one or more of the operations recited herein include one or more sub-operations. In some examples, any one or more of the operations recited herein is omitted. In some examples, any one or more of the operations recited herein is performed in an order other than that presented herein (e.g., in a reverse order, substantially simultaneously, overlapping, etc.). Each of these alternatives falls within the scope of the present description.

In the foregoing discussion and in the claims, the terms "including" and "comprising" are used in an open-ended fashion, and thus mean "including, but not limited to . . . ."

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Unless otherwise stated, "about," "approximately," or "substantially" preceding a value means +/−10 percent of the stated value.

The above description is illustrative of the principles and various embodiments of this description. Numerous variations and modifications will become apparent to those skilled in the art once the above description is fully appreciated. The following claims should be interpreted to embrace all such variations and modifications.

What is claimed is:

1. An apparatus, comprising:
   a light source;
   a photodetector configured to detect whether a display screen is transparent; and
   at least one processor coupled to the light source and to the photodetector, the at least one processor configured to:
   determine a latency of the display screen based on the photodetector detecting whether the display screen is transparent;
   instruct the light source to emit light during a first time period in a first mode;
   during a first shifted time period, transmit a first signal to the display screen instructing the display screen to be substantially opaque during the first time period in the first mode, wherein a difference between the first time period and the first shifted time period is based on the latency of the display screen;
   instruct the light source to not emit light during a second time period in a second mode; and
   during a second shifted time period, transmit a second signal to the display screen instructing the display screen to be substantially transparent during the second time period in the second mode, wherein a difference between the second time period and the second shifted time period is based on the latency of the display screen.

2. The apparatus of claim 1, wherein a duty cycle of the first mode and the second mode is fifty percent.

3. A method, comprising:
   detecting, by a photodetector, whether a display screen is transparent;
   determining, by at least one processor, a latency of the display screen based on the photodetector detecting whether the display screen is transparent;
   instructing, by the at least one processor, a light source to emit light during a first time period in a first mode;
   during a first shifted time period, transmitting, by the at least one processor, a first signal to the display screen instructing the display screen to be substantially opaque during the first time period in the first mode, wherein a difference between the first time period and the first shifted time period is based on the latency of the display screen;
   instructing, by the at least one processor, the light source to not emit light during a second time period in a second mode; and
   during a second shifted time period, transmitting, by the at least one processor, a second signal to the display screen instructing the display screen to be substantially transparent during the second time period, wherein a difference between the second time period and the second shifted time period is based on the latency of the display screen.

4. The method of claim 3, further comprising alternating repeatedly between the first mode and the second mode at a high frequency.

5. The method of claim 3, wherein the light source is a projector.

6. A system, comprising:
   a display screen; and
   a light source; and a photodetector configured to detect whether the display screen is transparent;
at least one processor coupled to the photodetector, to the display screen, and to the light source, wherein the at least one processor is configured to:
determine a latency of the display screen based on the photodetector detecting whether the display screen is transparent;
instruct the light source to emit light during a first time period in a first mode;
during a first shifted time period, transmit a first signal to the display screen instructing the display screen to be substantially opaque during the first time period in the first mode, wherein a difference between the first time period and the first shifted time period is based on the latency of the display screen;
instruct the light source to not emit light during a second time period in a second mode; and
during a second shifted time period, transmit a second signal to the display screen instructing the display screen to be substantially transparent during the second time period of time in the second mode, wherein a difference between the second time period and the second shifted time period is based on the latency of the display screen.

7. The apparatus of claim 1, wherein the apparatus is a projector.

8. The apparatus of claim 1, wherein the light source is a projector, the apparatus further comprising a control device coupled to the projector, the control device comprising the at least one processor.

9. The apparatus of claim 1, wherein the at least one processor is further configured to transmit a second signal to the light source during a third shifted time period, wherein an offset of the third shifted time period and the first time period is based on a latency of the light source.

10. The apparatus of claim 9, wherein the photodetector is further configured to determine whether the light source is emitting.

11. The apparatus of claim 10, wherein the at least one processor is further configured to determine the latency of the light source based on the photodetector determining whether the light source is emitting light.

12. The method of claim 3, further comprising transmitting, by the at least one processor, a second signal to the light source during a third shifted time period, wherein an offset of the third shifted time period and the first time period is based on a latency of the light source.

13. The method of claim 12, further comprising detecting, by the photodetector, whether the light source is emitting light.

14. The method of claim 13, further comprising determining, by the at least one processor, the latency of the light source based on the photodetector determining whether the light source is emitting light.

15. The method of claim 3, wherein a duty cycle of the first mode and the second mode is 50%.

16. The system of claim 6, wherein the system comprises a projector, the projector comprising the light source, the at least one processor, and the photodetector.

17. The system of claim 6, further comprising a control device, the control device comprising the at least one processor and the photodetector.

18. The system of claim 6, wherein the at least one processor is at least one first processor, the photodetector is a first photodetector, the display screen comprising:
at least one second processor; and
a second photodetector coupled to the at least one second processor.

19. The system of claim 6, wherein the system is a vehicle.

20. The system of claim 6, wherein the photodetector is further configured to determine whether the light source is emitting, and the at least one processor is further configured to:
determine the latency of the light source based on the photodetector determining whether the light source is emitting light; and
transmit, by the at least one processor, a second signal to the light source during a third shifted time period, wherein an offset of the third shifted time period and the first time period is based on a latency of the light source.

* * * * *